United States Patent
Flegel

[11] 3,810,064
[45] May 7, 1974

[54] TEMPERATURE CONTROLLER
[75] Inventor: David D. Flegel, Racine, Wis.
[73] Assignee: Reliance Time Controls, Racine, Wis.
[22] Filed: May 31, 1973
[21] Appl. No.: 365,577

[52] U.S. Cl. .................................. 337/304, 236/46
[51] Int. Cl. .......................................... H01h 37/00
[58] Field of Search .............. 337/301, 304; 236/46; 74/124

[56] References Cited
UNITED STATES PATENTS
| | | | |
|---|---|---|---|
| 2,549,461 | 4/1951 | Haller | 337/304 X |
| 3,203,265 | 8/1965 | Flegel | 74/124 |
| 3,258,552 | 6/1966 | Harris | 337/301 X |

*Primary Examiner*—Roy N. Envall, Jr.
*Attorney, Agent, or Firm*—Andrus, Sceales, Starke & Sawall

[57] ABSTRACT

A controller for attachment to a thermostat includes a drive portion and a control portion. The drive portion is actuated by a spring wound motor and includes a gear-and-shaft drive train. The control portion primarily includes a sleeve fixedly mounted to the input control shaft of a thermostat. A gear on the sleeve forms the downstream end of the said drive train. A dial plate having suitable temperature indicia thereon is also mounted to the sleeve, and is manually settable at a mark on a temperature setting indicator post, and to the desired ambient or minimum temperature, as by a control knob connected to a drive train shaft. A clutch permits overriding of the drive train downstream of the shaft. A temperature change member is manually rotatable on the said sleeve to selectively pre-set an arrow to the desired maximum thermostat temperature setting. After adjusting the temperature change member, it is locked on the sleeve. Actuation of the motor will rotate the sleeve and associated parts until an arm on the temperature change member engages a stop member. Further increase of the thermostat setting is thus prevented, although the motor may keep on running, due to the clutch mechanism in the drive train. The arcuate distance between the forward edge of the said arm and the said arrow is equal to the arcuate distance between the engagement surface of the said stop member and the indicator post mark.

7 Claims, 5 Drawing Figures

PATENTED MAY 7 1974

TEMPERATURE CONTROLLER

BACKGROUND AND SUMMARY OF THE INVENTION

This invention relates to a temperature controller, and more particularly to a device for automatically increasing the setting of a furnace-controlling thermostat to a selected predetermined maximum, for use in curing of tobacco and other suitable applications.

The device is an improvement over U.S. Pat. No. 3,203,265 issued Aug. 31, 1965 and entitled "Rate of Change Controller".

The device of the invention includes a controller for attachment to a thermostat, and includes a drive portion and a control portion. The drive portion is actuated by a spring wound motor and includes a gear-and-shaft drive train, The control portion primarily includes a sleeve fixedly mounted to the input control shaft of a thermostat. A gear on the sleeve forms the downstream end of the said drive train. A dial plate having suitable temperature indicia thereon is also mounted to the sleeve, and is manually settable at a mark on a temperature setting indicator post, and to the desired ambient or minimum temperature, as by a control knob connected to a drive train shaft. A clutch permits overriding of the drive train downstream of the shaft. A temperature change member is manually rotatable on the said sleeve to selectively pre-set an arrow to the desired maximum thermostat temperature setting. After adjusting the temperature change member, it is locked on the sleeve. Actuation of the motor will rotate the sleeve and associated parts until an arm on the temperature change member engages a stop member. Further increase of the thermostat setting is thus prevented, although the motor may keep on running, due to the clutch mechanism in the drive train. The arcuate distance between the forward edge of the said arm and the said arrow is equal to the arcuate distance between the engagement surface of the said stop member and the indicator post mark.

DESCRIPTION OF THE DRAWINGS

The accompanying drawings illustrate the best mode presently contemplated by the inventor for carrying out the invention.

In the drawings:

FIG. 1 is a diagrammatic illustration of a controller constructed in accordance with the invention and applied to a temperature control for curing tobacco or the like;

DESCRIPTION OF THE PREFERRED EMBODIMENT

Figure 1:
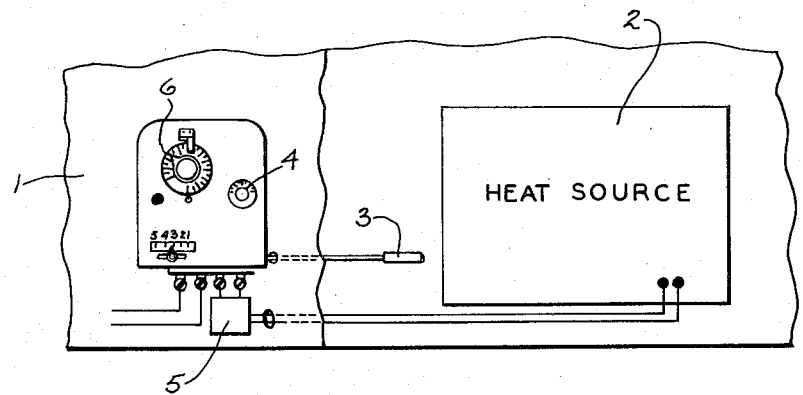

As shown in FIG. 1 of the drawings, the device of the invention is adapted for use in a tobacco curing barn or the like 1 having a furnace 2 or other suitable heat source for the barn space. A temperature responsive element 3 is disposed within barn 1 and is connected to a thermostat 4 which, in turn, is connected through a suitable control unit 5 to activate or deactivate the furnace. If thermostat 4 is of the modulating gas valve type, unit 5 may not be needed.

The invention contemplates a manually settable controller 6, which may be mounted on an outer barn wall, and which automatically increases the setting of thermostat 4 up to a predetermined pre-set maximum. As shown, controller 6 comprises a drive portion 7 and a control portion 8 which is interconnected to portion 7, as will be described. Both portions may be mounted on the same controller frame 9, as shown, or may be mounted on separate frames without departing from the spirit of the invention.

Figure 2:
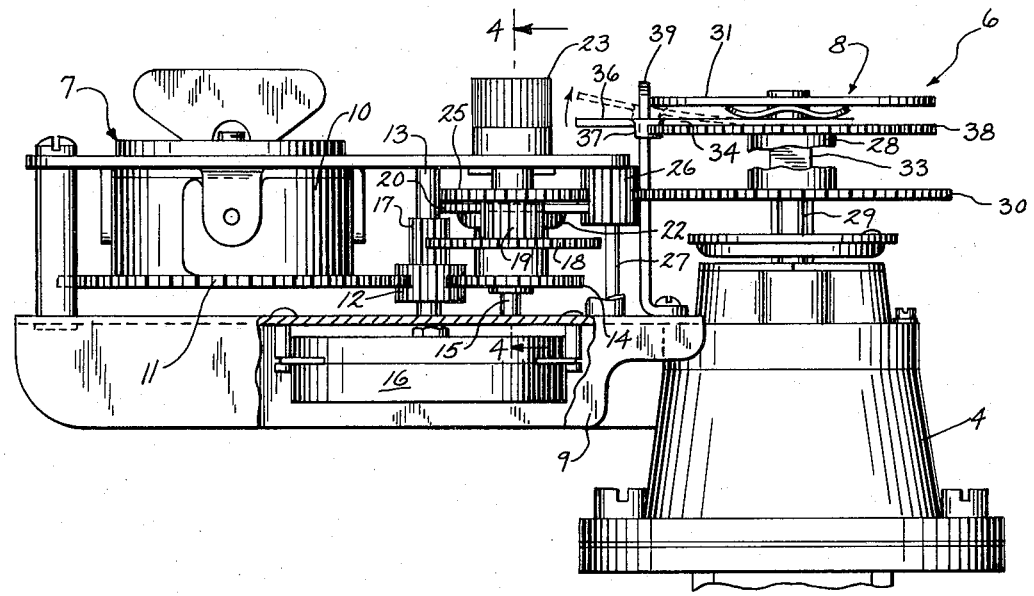
FIG. 2 is an enlarged side elevation of the controller and associated parts.
Figure 3:
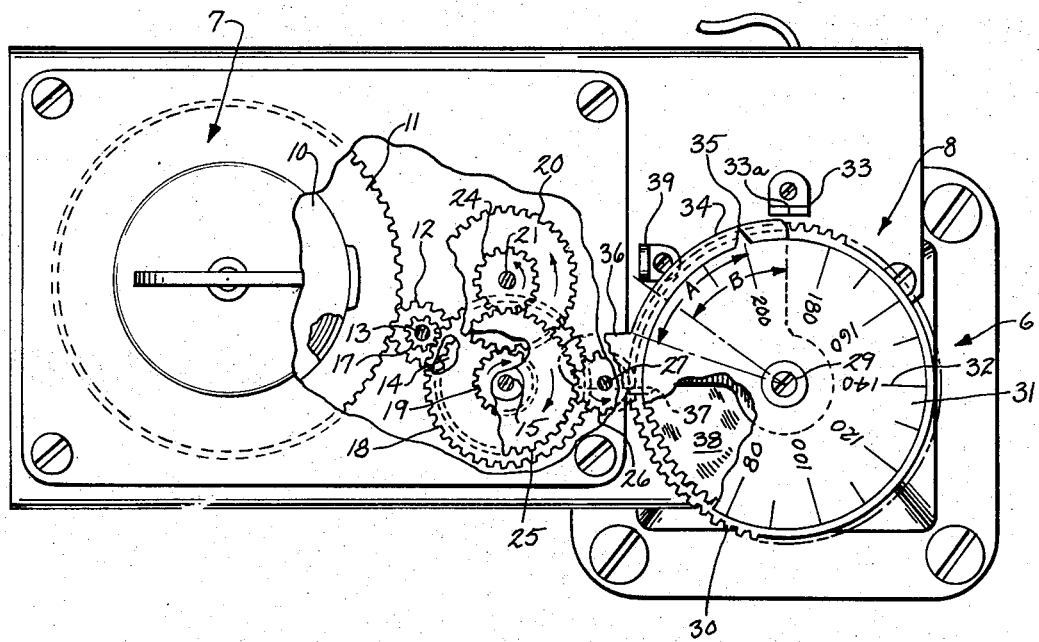
FIG. 3 is a top plan view of the controller and associated parts at an initial setting position, and with parts broken away and in section.
Figure 4:
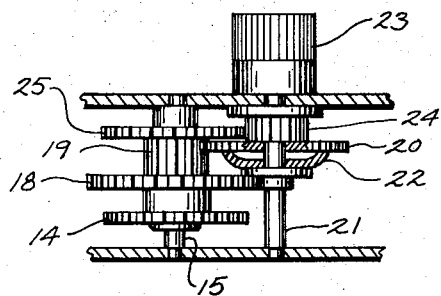
FIG. 4 is a section taken on line 4—4 of FIG. 2.

Referring to FIGS. 2-4 of the drawings, a spring wound timing motor 10 is mounted to frame 9 and has an external output drive gear 11 thereon. Gear 11 drives through an idler pinion 12, freely mounted on a first shaft 13 on frame 9, to a second gear 14 fixed to a second shaft 15 on the frame. A clocklike escapement mechanism 16 is connected to first shaft 13 and acts as a speed controlling governor therefore. Mechanism 16 also governs the speed of second shaft 15 via a pinion 17 fixed on shaft 13 and which engages a third gear 18 fixed to shaft 15.

Gear 14 serves as the drive input to shaft 15, and the drive output thereof comprises a pinion 19 fixed thereto. Pinion 19 drives a fourth gear 20 fixedly mounted on a third shaft 21 on the frame.

Gear 20 serves as the drive input to shaft 21 and is frictionally clutched to the shaft, as by a biasing spring 22. A further rotary input to shaft 21 is provided for purposes to be described, and comprises a manually operable adjustment knob 23 mounted on the shaft end.

In response to either input for shaft 21, the output thereof comprises a pinion 24 fixed to the shaft. Pinion 24 drives a fifth gear 25 which idles on shaft 15. Gear 25 in turn drives through a pinion 26 fixedly mounted on a fourth shaft 27 on frame 9 to control portion 8.

Control portion 8 includes a sleeve 28 fixedly mounted on the input control shaft 29 of thermostat 4, with the latter being suitably mounted to frame 9. Sleeve 28 fixedly mounts a 6th or input gear 30 at its inner end, with gear 30 meshing and driven by pinion 26. The outer end portion of sleeve 28 fixedly mounts a disc-like dial plate 31 having suitable arcuately positioned temperature indicia 32 thereon. A temperature setting indicator post 33 having a mark 33a is fixedly mounted to thermostat 4 and extends outwardly toward plate 31 and just outside the periphery thereof.

Sleeve 28 also supports a temperature change control member 34 just inwardly of plate 31. Member 34 includes a radially outwardly extending indicator arrow 35 and a radially outwardly extending arm 36, for purposes to be described. By grasping and lifting arm 36, member 34 may be adjustably rotated about sleeve 28 and thermostat shaft 29. However, means are provided to lock member 34 into fixed relationship with sleeve 28. For this purpose, a cog 37 extends downwardly from arm 36 and into selective locking engagement with the teeth of a seventh or locking gear 38 fixedly mounted to sleeve 28.

In addition, a post-like stop member 39 is mounted on frame 9 for engagement by arm 36, as will be described.

As shown FIG. 3, the fixed arcuate distance A between the forward edge of arm 36 and arrow 35 is the same as the fixed arcuate distance B between the rearwardly facing engagement surface of stop member 39 and indicator post mark 33a.

Figure 5:
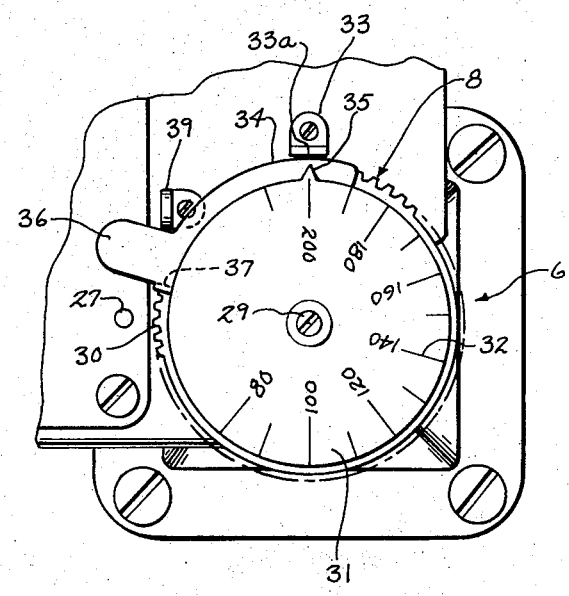
FIG. 5 is a fragmentary view similar to a portion of FIG. 3 and showing the position of the parts when the selected maximum temperature has been reached.

The device of the invention is adapted to gradually increase the setting of thermostat 4, and thus the temperature within barn 1, from a predetermined minimum (usually the ambient temperature at the moment of setting) to a predetermined maximum, at which point the temperature will be held constant. For this purpose, knob 23 is turned to rotate plate 31 so that the indicia setting of post 33 is in registry with the desired minimum or ambient temperature indicia on the plate, such as 190° as shown in FIG. 3. Knob 23 overrides clutch spring 22 so that the downstream portion of the drive train beyond shaft 21 can be adjusted. Arm 36 is then manually lifted to release cog 37 from locking gear 38, and member 34 is rotated until arrow 35 is pre-set at the desired maximum temperature setting, such as 200°, as also shown in FIG. 3. Actuation of motor 10, by winding or the like, will then drive through the previously described drive train to thereby slowly rotate gear 30 and thermostat shaft 29 to gradually increase the thermostat setting and resultant temperature within barn 1. This automatic increase will continue until arm 36 positively engages stop member 39, as shown in FIG. 5. Subsequently, the thermostat setting will remain constant, even though motor 10 may continue to operate, since clutch spring 22 will permit rotation of the drive train up to shaft 21, even though no rotation is possible beyond that point.

Various modes of carrying out the invention are contemplated as being within the scope of the following claims particularly point out and distinctly claiming the subject matter which is regarded as the invention.

I claim:

1. A mechanism for automatically increasing temperature of a space from a minimum temperature to a predetermined maximum temperature, said mechanism comprising:
   a. a frame,
   b. a thermostat mounted on said frame and with said thermostat having a rotary input shaft,
   c. an indicating mark on said thermostat,
   d. a timing motor mounted on said frame adjacent said thermostat,
   e. a gear-and-shaft type drive train connected to said motor and driven thereby,
   f. a sleeve fixedly mounted on said thermostat input shaft,
   g. a gear forming the downstream end of said drive train and fixedly mounted to said sleeve,
   h. a dial plate fixedly mounted to said sleeve and with said plate having arcuately positioned temperature indicia thereon for registry with said mark,
   i. means to manually actuate at least a portion of said drive train to thereby rotate said sleeve, shaft and dial plate to a position relative to said mark wherein said thermostat is selectively set at a minimum temperature,
   j. a temperature change control member mounted on said sleeve adjacent said dial plate,
   k. an outwardly extending arm on said control member,
   l. an outwardly extending indicator on said control member and with said indicator being arcuately spaced from said arm,
   m. said temperature change control member being manually rotatable about said sleeve to thereby selectively pre-set said indicator to a position relative to the said temperature indicia on said dial plate to provide a maximum desired temperature setting on said thermostat,
   n. means to lock said temperature change control member relative to said dial plate,
   o. and a stop member mounted on said frame and having a surface for engagement by said arm during rotation of said sleeve and shaft by said motor to prevent rotation of said dial plate and shaft beyond the selected desired maximum temperature setting.

2. The mechanism of claim 1 wherein: the arcuate distance between the forward edge of said arm and said indicator is the same as the arcuate distance between the engagement surface of said stop member and said mark.

3. The mechanism of claim 2:
   a. in which said drive train actuating means (g) comprises a knob on one of the shafts in said drive train,
   b. and which includes a clutch disposed on said last-named shaft and connected in said drive train to permit rotation of said last-named shaft and the drive train only downstream therefrom by manual rotation of said knob.

4. The mechanism of claim 3 in which said locking means (n) comprises:
   a. a locking gear fixedly mounted to said sleeve and disposed adjacent said arm,
   b. and a cog on said arm with said cog being selectively engageable with the teeth of said locking gear.

5. A temperature controlling device for attachment to the rotary input shaft of a thermostat having an indicating mark thereon, said device comprising:
   a. a frame,
   b. a timing motor mounted on said frame,
   c. a gear-and-shaft type drive train connected to said motor,
   d. a sleeve for fixedly mounting on the said input shaft of said thermostat,
   e. a gear forming the downstream end of said drive train and fixedly mounted to said sleeve,
   f. a dial plate fixedly mounted to said sleeve and with said plate having arcuately positioned temperature indicia thereon,
   g. means to manually actuate at least a portion of said drive train to thereby rotate said sleeve and dial plate to a position relative to said indicating mark so that the thermostat is selectively set at a minimum temperature,
   h. a temperature change control member mounted on said sleeve adjacent said dial plate,
   i. an outwardly extending arm on said control member,
   j. an outwardly extending indicator on said control member and with said indicator being arcuately spaced from said arm,
   k. said temperature change control member being manually rotatable about said sleeve to thereby selectively pre-set said indicator to a position relative to the said temperature indicia on said dial plate to provide a maximum desired temperature setting for the thermostat,
l. means to lock said temperature change control member relative to said dial plate,
m. and stop means mounted on said frame for engagement by said arm during rotation of said sleeve by said motor to prevent rotation of said dial plate beyond the selected desired maximum temperature setting.

6. The temperature controlling device of claim 5:
a. in which said drive train actuating means (g) comprises a knob on one of the shafts in said drive train;
b. and which includes a clutch disposed on said last-named shaft and connected in said drive train to permit rotation of said last-named shaft and the drive train only downstream therefrom by manual rotation of said knob.

7. The temperature controlling device of claim 5 in which said locking means (l) comprises:
a. a locking gear fixelly mounted to said sleeve and disposed adjacent said arm,
b. and a cog on said arm with said cog being selectively engageable with the teeth of said locking gear.

* * * * *